United States Patent
Smith-Rose et al.

(10) Patent No.: US 11,706,211 B2
(45) Date of Patent: Jul. 18, 2023

(54) COMPUTER-BASED SYSTEMS CONFIGURED FOR ONE-TIME PASSCODE (OTP) PROTECTION AND METHODS OF USE THEREOF

(71) Applicant: Capital One Services, LLC, McLean, VA (US)

(72) Inventors: Asher Smith-Rose, Arlington, VA (US); Lin Ni Lisa Cheng, New York, NY (US); Shabnam Kousha, Washington, DC (US); Tyler Maiman, Melville, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 99 days.

(21) Appl. No.: 17/487,266

(22) Filed: Sep. 28, 2021

(65) Prior Publication Data
US 2023/0096899 A1  Mar. 30, 2023

(51) Int. Cl.
*H04L 9/40* (2022.01)
*H04L 41/22* (2022.01)

(52) U.S. Cl.
CPC .......... *H04L 63/0838* (2013.01); *H04L 41/22* (2013.01); *H04L 63/0846* (2013.01); *H04L 63/1416* (2013.01); *H04L 63/1483* (2013.01); *H04L 63/20* (2013.01)

(58) Field of Classification Search
CPC ....... H04L 9/40; H04L 63/0838; H04L 41/22; H04L 63/0846; H04L 63/1416; H04L 63/1483; H04L 63/20
See application file for complete search history.

(56) References Cited

U.S. PATENT DOCUMENTS

| | | | |
|---|---|---|---|
| 9,002,750 B1 * | 4/2015 | Chu | H04W 12/04 705/72 |
| 9,208,354 B2 | 12/2015 | Lal et al. | |
| 9,785,775 B1 | 10/2017 | Turner | |
| 10,771,456 B2 | 9/2020 | Roth et al. | |
| 2013/0132091 A1 * | 5/2013 | Skerpac | G06F 21/32 704/273 |
| 2021/0158360 A1 * | 5/2021 | Somani | H04L 63/1416 |

FOREIGN PATENT DOCUMENTS

AU    2006242555 A1 *  11/2007  ........... G06F 21/316

* cited by examiner

*Primary Examiner* — Jayesh M Jhaveri
(74) *Attorney, Agent, or Firm* — Greenberg Traurig, LLP

(57) ABSTRACT

Systems and methods of anti-vishing OTP protection via machine learning techniques are disclosed. In one embodiment, an exemplary computer-implemented method may comprise: receiving a permission indicator identifying a permission by the user to detect OTPs and calls being received by a computing device; receiving an indication of an OTP data item being received; processing the OTP data item to determine a time duration during which a particular OTP included therein is valid; utilizing a trained OTP protection machine learning model to determine phone number(s) as presenting a security risk with respect to the OTP data item; and instructing the computing device to commence at least one security measure based at least in part on a contact list updated with an indication that the phone number(s) present a security risk with regard to the particular OTP during the time duration of the particular OTP.

20 Claims, 8 Drawing Sheets

COMPUTER-BASED SYSTEMS CONFIGURED FOR ONE-TIME PASSCODE (OTP) PROTECTION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more practical technological improvement applications utilizing one or more machine learning techniques to protect various types of information, including, but not limited, sensitive and/or private information against fraudulent activities.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, one fraudulent attack may be a vishing-type attack after sensitive or private information such as a valid one-time password (OTP) received at a computing device of a user. When sensitive and/or private information is known to reside on a computing device of a user and there is no automatically triggered protection that prevents such sensitive/private information from been communicated to fraudulent entities, the receipt of, for example, a valid OTP may lead to breaches and security risks for various users and service providers.

SUMMARY OF DESCRIBED SUBJECT MATTER

In some embodiments, the present disclosure provides various exemplary technically improved computer-implemented methods involving OTP protection, the method including steps such as: obtaining, by one or more processors, a trained One-Time Passcode (OTP) protection machine learning model that determines at least one phone number as presenting a security risk with respect to an OTP; and one or both of profile information and contextual information of the first plurality of users or the first plurality of issuing entities; receiving, by the one or more processors, from a computing device of a user, a permission indicator identifying a permission by the user to detect OTPs and calls being received by the computing device; receiving, by the one or more processors, from the computing device, an indication of at least one OTP data item being received, the at least one OTP data item including a particular OTP and associated with an authentication process of a particular issuing entity; processing, by the one or more processors, the at least one OTP data item to determine a time duration during which the particular OTP is valid; utilizing, by the one or more processors, the trained OTP protection machine learning model to determine one or more phone numbers as presenting a security risk with respect to the at least one OTP data item based at least in part on the particular OTP; instructing, by the one or more processors, the computing device to update a contact list with an indication that the one or more phone numbers present a security risk with regard to the particular OTP during the time duration of the particular OTP; and instructing, by the one or more processors, the computing device to commence at least one security measure based at least in part on the updated contact list.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
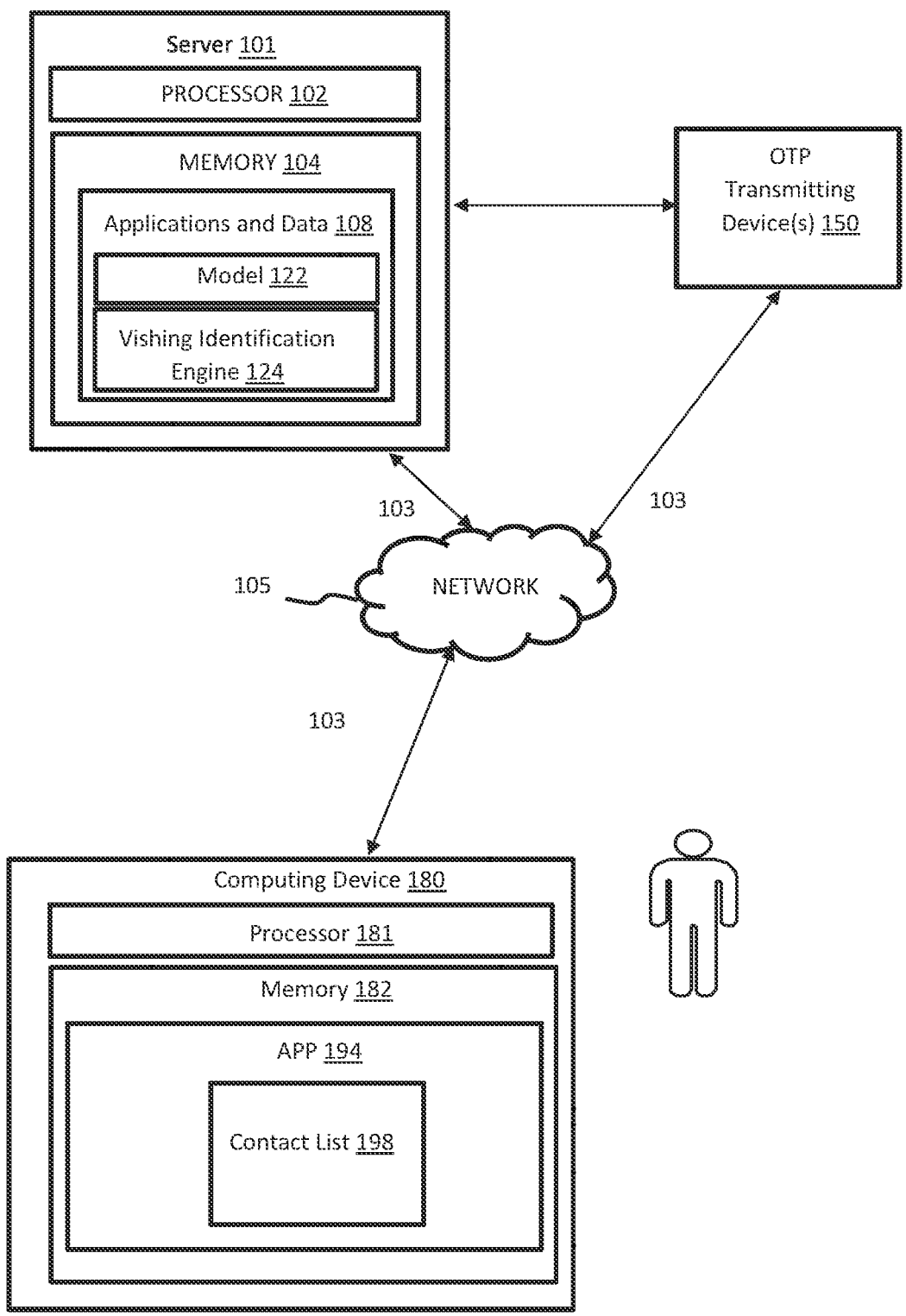
FIG. 1 is a block diagram of an exemplary system and/or platform illustrating aspects of OTP protection (e.g., anti-vishing OTP protection), consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the diversity of and intelligence gleaned from various communication events and at the same time to leverage advanced data processing capabilities, various embodiments of the present disclosure provide for improved computer-based platforms or systems, improved computing components and devices configured for one or more practical technological improvements involving: detecting OTPs received at computing devices of users, determining one or more phone numbers as presenting a security risk with respect to the OTPs, performing security measure(s) to safeguard the OTPs against security attacks based on the one or more phone numbers, as well as generating intelligence (e.g., machine learning models, etc.) empowered by the various user OTP related events, phone numbers deemed as presenting security risks, user profile information and user contextual information, and/or OTP issuing entity profile information and contextual information to, for example, automate the identification of phone numbers associated with fraudulent entities which pretend as the OTP issuing entities to engage in various security attacks (e.g., vishing sensitive, private, or security related data) with enhanced efficiency, accuracy, relevancy, and accessibility.

As used herein, in some embodiments, the term "OTP" refers to a dynamic code that is utilized in connection with an authentication scheme that verifies the identities of users for the purposes of, for example, allowing the users access to network resource(s). An OTP may be generated, partially or fully, by an authentication server (e.g., a computing device and/or software construct that is programmed with computer instructions to perform at least one authentication procedure) of an entity and/or or by hardware/software application programs executing on a computing device of a user. In some embodiments, once the authentication server would match the generated OTP with an OTP entered by the user, the authentication scheme would successfully verify the identity of the user (e.g., in a two-factor authentication process), and/or proceed to another verification procedure (e.g., multi-factor authentication process).

In some embodiments, an OTP generated by an authentication server may be transmitted to the computing device of the user via various communication channels. By way of non-limiting examples, an OTP may be sent to the user via an email, an SMS message, an MMS message, a chat message, a social media post, a voice message, an in-app message, or other similarly suitable communication channel. In some embodiments, an OTP may be dynamically generated as a time-based code, and valid only for a period of time. In some embodiments, an OTP may include a value, an alphanumerical string, and/or any content item(s) communicable to the user. An OTP message (e.g., OTP data item) including an OTP may have other information such as information pertaining to the issuing entity, the time stamp associated with the OTP message, and so on. For example, an OTP message may include the issuing entity information in the form of a phone number, a short code (e.g., a five-digit or six-digit code designated to the message sender, etc.) in the metadata, or specify such information in the body of the message.

As detailed herein, typically, various computer-based technological problems may arise when computer technology may be utilized by fraudsters to engage in various types of technology-facilitated fraudulent attacks. As used herein, in some embodiments, the term "vishing" refers to a fraudulent act or a security attack using verbal or audio scams or schemes to trick people into performing certain actions believed as done in their best interest or protection. Typically, in vishing, fraudsters could try to convince unsuspected users to provide them valuable information over the phone. The valuable information can include, without limitation, any sensitive information (that can be further used for additional social engineering), credit card numbers, credentials full legal names, birthdates, home addresses, billing addresses, mother's maiden names, phone numbers, credit card information, financial information, login credentials, and the like. Typically, vishing calls may exploit the fact that we're more likely to trust a human voice. Typically, the vishing attacks may differ in scope, targets and/or patterns. In some cases, a vishing attacker could be after an OTP recently received and valid on a user's computing device, the vishing fraudster typically masquerades as affiliated with the entity who has issued the valid OTP to the user. In some cases, vishing attacks may also be performed via malware installed on the user's computing device and trick the user into calling the vishing attacker themselves when a valid OTP is alive on their devices. For example, cybercriminals may engage a vishing campaign targeting employees working from home. For example, the attackers may collect login credentials for corporate networks, which they then monetized by selling access to corporate resources to other bad actors.

Typically, vishing attacks may be sophisticated and require thorough research and a phishing setup to work. The phishing pages were made to look like a targeted company's internal VPN (Virtual Private Network) login page, and the sites were also capable of capturing two-factor authentication (2FA) or one-time passwords (OTP) if the situation required. Typically, bad actors then may compile dossiers on the employees working for the companies they may want to target, typically by mass scraping of public profiles on social media platforms, recruiter and marketing tools, publicly available background check services, and/or open-source research. Typically, collected information may include: name, home address, personal cell/phone number, the position at the company, duration at the company, and the like.

There could be the following exemplary vishing attacks:
i) Telemarketing Fraud—where fraudsters intend to scam users for payment or quick gain; for an example, 'a charity needs your help and that you can make a difference with even just a small donation;' in such case, the charities don't exist, and the donated money ends up in the hands of the fraudsters;

ii) Government Impersonations—where fraudsters impersonate the government (usually Tax Authorities, Social Security and so on) to scam the users; fraudsters may use the emergency of a situation to request payments;

iii) Tech Support Fraud—fraudsters pretending to be tech support for a company; the fraudster may inform the user that something is wrong with their device and they'd need remote access to fix it; later, they'd charge the user for the problem that didn't even exist;

iv) Bank or Financial Institutions Impersonations—financial vishing scams often involve an actor impersonating a bank, credit card company, or another financial institution to get information about your personal, financial, or account credentials.

Typically, vishing is just one form of phishing, which is any type of message—such as an email, text, phone call or direct-chat message—that appears to be from a trusted source, but isn't. Typically, the goal is to steal someone's identity and/or money. Typically, one computer-based telecommunication technological problem, involving vishing or any other type of phishing attacks, may be due to the fact that computer-based telecommunication technology may make it easier to contact more people. For example, scammers may place hundreds of calls at a time using voice over internet protocol (VoIP) technology and can spoof the caller ID to make the call appear to come from a trusted source, such as one's bank.

Various embodiments disclosed herein may be implemented in connection with one or more entities that provide, maintain, manage, and/or otherwise offer any services relating to user verification or user authentication system(s). In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of technologically improved OTP protection (e.g., anti-vishing OTP protection) via utilization of at least one machine learning technique, in accordance with one or more embodiments of the present disclosure. An exemplary system 100 may include at least one server 101, and at least one computing device 180 associated with a user, which may communicate 103 over at least one communication network 105. In some embodiments and in optional combination with one or more embodiments described herein, the system 100 may further include and/or be operatively connected and/or be in electronic communication with one or more OTP transmitting devices 150, from which the computing device 180 may receive an OTP (not shown) during a process of, for example, verification of the user's identity or other information, in connection with authenticating the user prior to allowing the user access to a particular network resource (e.g., server/application/device/service), and the like. In various embodiments, the verification process may include multi-factor authentication (e.g., two-factor authentication) that makes use of an OTP in addition to or instead of requiring that the user inputs login credentials such as a pair of username and password each time user authentication is performed.

In some embodiments, the OTP transmitting device 150 may be configured to receive the OTP generated by an OTP generator application or a service providing OTP based authentication (not shown) such that the OTP transmitting device 150 may function only to communicate the OTP to the computing device 180 of the user. In other embodiments, the OTP transmitting device 150 may execute the OTP generator application and/or service itself to generate and/or transmit the OTP to the computing device 180. In some embodiments, the OTP may as well be generated by an OTP generator application installed and executing on the computing device 180 of the user. OTP generator applications or services may implement various suitable techniques or algorithms to generate OTPs, remotely from or locally on the computing device 180. Non-limiting examples of OTP algorithms that may be used by the OTP generator application/service include a time-based OTP algorithm, an event-based OTP algorithm, and a hash-based message authentication code (HMAC) OTP algorithm. The OTP may be sent to the computing device 180 in various manners such as, for example, short message service (SMS), email, social media message service, chat service, a phone call, and the like. Although the following illustrate embodiments of the present disclosure using an example where the computing device 180 receives the OTP from the OTP transmitting device 150 via SMS, it should be understood that various embodiments of the present disclosure can be applied to an OTP that would be generated and/or transmitted in any suitable manner.

Furthermore, although embodiments herein use examples involving OTPs to illustrate the improved features and functionality associated with protecting valid OTPs from security attacks, it should be understood that any other information and data vulnerable to security attacks can be protected using various embodiments of the disclosure with improved user security and privacy.

Still referring to FIG. 1, in some embodiments, the OTP transmitting devices 150 may be hosted or implemented at the server 101 such that both the above-described OTP transmitting device capability together with the features and functionality associated with the server 101 may be implemented for the same entity such as, for example, the financial service entity described above. For instance, the server 101 may include an authentication server such that the server 101 may both transmit the OTP and furnish the anti-vishing OTP protection with regard to the OTP sent to the computing device 180.

In other embodiments, the OTP transmitting device 150 may be implemented at one or more computing devices independent of the server 101 so as to separate the OTP transmitting device capabilities from the features and functionality of the server 101. For example, in some embodiments, the server 101 may be configured to enable or provide the features and functionality of anti-vishing OTP protection with regard to the OTPs received at the computing device 180 from a multitude of OTP transmitting devices that may be associated with various entities for verifying the identity of the user. By way of non-limiting examples, an entity associated with the OTP transmitting device 150 may include a banking entity, an online retailer, an entity providing a streaming service, a gaming service, an email service, a social media site, a chat service, and the like.

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be stand-alone, or it may be part of a subsystem, which may, in turn, be part of a larger computer system. In some embodiments, server 101 may be associated with an entity such as a financial institution (, such as a credit card company that services an account of the user, and thereby having the need to verify or authenticate the user in association with various aspects of providing the account services. For instance, the credit card company may host various network resources (e.g., web servers hosting banking services and credit card services, databases, emails, web portals, etc.) that may require the user to authenticate himself or herself in order to access. Typically, the user authentication may include a two-factor authentication process using user credentials (e.g., usernames and passwords) together with a valid OTP. In one example, the server 101 may host an authentication server in connection with hosting the network resources provided to the user.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may utilize one or more machine learning techniques to provide all or portions of the features and/or functionality associated with OTP protection (e.g., anti-vishing OTP protection), in conjunction with or independent of OTP protection (e.g., anti-vishing OTP protection) implemented at the computing device 180 and/or the OTP transmitting devices 150.

In some embodiments, the features and functionality may include operations such as: obtaining training data (e.g., training OTPs associated with respective issuing entities and received by a first plurality of users, training phone numbers determined to be risky with respect to the training OTPs, and/or the profile information and/or contextual information associated with the first plurality of users or the issuing entities); training an OTP protection machine learning model with the training data; obtaining a trained OTP protection machine learning model that determines at least one phone number as presenting a security risk with respect to an OTP; receiving an indicator identifying a permission by a user to detect OTPs, phone calls, emails, messages, and/or other communications received at a computing device of the user; receiving an indication of an OTP data item being received in association with an authentication process of a particular issuing entity; processing the OTP data item to determine a time duration during which the particular OTP of the OTP data item is valid; utilizing the trained OTP protection machine learning model to determine one or more phone numbers as presenting a security risk with respect to the OTP data item based at least in part on the particular OTP; instructing the computing device to update a contact list with an indication that the one or more phone numbers present a security risk with regard to the particular OTP during the time duration of the particular OTP; and instructing the computing device of the user to commence at least one security measure based at least in part on the updated contact list. In some embodiments not shown herein, the features and functionality of the server 101 may be partially or fully implemented at the computing device 180 such that the illustrative anti-vishing OTP protection process may be performed partially or entirely on the computing device 180, associated with the user.

In some embodiments, the application(s) and data 108 may include an exemplary OTP protection machine learning model 122. In some embodiments, the OTP protection machine learning model 122 may be trained at the server 101. In other embodiments, the OTP protection generation machine learning model 122 may be trained by another entity with the training data provided by another entity, and/or with the training data provided by server 101. In some embodiments, the OTP protection machine learning model 122 may also be trained and re-trained at the computing device 180 associated with the user. In the latter case, the OTP protection machine learning model 122 may be trained and/or re-trained with training data specific to the user at the computing device 180. In this sense, the OTP protection machine learning model 122 itself may be user-specific, residing on the server 101 and/or the computing device 180.

Various machine learning techniques may be applied to train and re-train the OTP protection machine learning model 122 with training data and feedback data, respectively. In various implementations, such a machine learning process may be supervised, unsupervised, or a combination thereof. In some embodiments, such a machine learning model may comprise a statistical model, a mathematical model, a Bayesian dependency model, a naive Bayesian classifier, a Support Vector Machine (SVMs), a neural network (NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of neural network may be executed as follows:

a. Define Neural Network architecture/model,
b. Transfer the input data to the exemplary neural network model,
c. Train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary OTP protection machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the application(s) and data 108 may include a vishing identification engine 124 that may be programmed to execute the exemplary OTP protection machine learning model 122. In some embodiments, the vishing identification engine 124 may receive, as input, an indication that an OTP associated with a particular authentication entity has been sent to a user's computing device, and utilize the OTP protection machine learning model 122 to identify the respective one or more phone numbers as presenting a security risk for the input OTP. Subsequently, the vishing identification engine 124 may compile, generate, and/or update a contact list recording the determined one or more phone numbers. In some embodiments, the determined one or more phone numbers may be stored in association with the identification information of the respective authentication entity that would issue or cause to issue the particular OTP at the application(s) and data 108, or an external data source. In other embodiments, the contact list of the determined one or more phone numbers may be transmitted to the computing device 180 in response to the indication that a valid OTP is received and alive at the computing device 180. More details of the OTP protection machine learning model 122 and the vishing identification engine 124 are described with reference to FIG. 4, below.

Still referring to FIG. 1, an illustrative computing device 180 associated with a user may comprise: one or more processors 181 and a non-transient computer memory 182. Memory 182 may store instructions that, when executed by the one or more processors 181, perform various procedures, operations, or processes consistent with disclosed embodiments. In one embodiment, the memory 182 may include an application (APP) 194 that, when executed by the one or more processors 181, may perform operations such as: prompting the user for a permission to detect communications via the computing device 180 (e.g., OTPs, phone calls, SMS, emails, etc.); detecting communications via the computing device 180 according to the permission obtained from the user; extracting information (e.g., the calling phone number; and texting number; the email sender address, etc.) from the detected communications; receiving an OTP transmitted from the OTP transmitting device 150; receiving, storing, and/or updating a contact list 198 (of the one or more phone numbers determined as presenting a security risk to the OTP); triggering the computing device 180 into performing one or more security measures based on the contact list 198; reporting one or more phone numbers determined as suspicious of presenting a security risk with respect to a particular OTP received; and training and re-training the OTP protection machine learning model 122. In various embodiments, the application 194 may be implemented in any suitable manner such as, without limitation, a standalone application, a browser extension, and the like. Various features and functionality of the application 194 may be implemented as part of other applications, and/or implemented in multiple applications to include more than, less than the features and functionality described above, and/or with combination with any other features and functionality.

In some embodiments, the application 194 may be configured such that the functionality involving phone calls (and communications at various other communication channels) is implemented in a separate application executing on the computing device 180. For instance, such application may be configured to detect a variety of communications of the user at the computing device 180, intercept those communication at the computing device 180, monitor those communication at the computing device 180, and/or interject one or more suitable controls (e.g., user operable controls) over those communications at the computing device 180. In some embodiments, such application may be configured to obtain information of the communication transmitting party(ies) (e.g., the calling phone number), information of the communication (e.g., the time duration of a phone call), content of the communication (e.g., the identity of an SMS sending entity, the content of the conversation of a phone call). In some embodiments, such application may be configured to obtain permissions from the user in order to execute all or part of the exemplary functionality described above.

In some embodiments, for the purpose of simplicity, features and functionalities associated with the exemplary OTP protection machine learning model 122 (e.g., training, re-training, etc.) are illustrated as implemented by components of server 101. It should be noted that one more of those OTP protection machine learning model-related aspects and/or features may be implemented at or in conjunction with the computing device 180 of the user. For example, in some embodiments, the OTP protection machine learning model 122 may be partially trained at the server 101 with other users' OTP events and corresponding phone numbers determined as risky therefor, and in turn transmitted to the computing device 180 to be fully trained with the user specific OTP events and phone numbers determined as risky for those OTP events. In another example, the converse may be performed such that the machine learning model 122 may be initially trained at the computing device 180 and subsequently transmitted to the server 101 for application and/or further training with training data from other users. Further, the contact list 198 may also be stored entirely on the computing device 180, in conjunction with the server 101, or entirely at server 101. In some embodiments, when the OTP protection machine learning model 122 is trained or re-trained at the computing device 180, the OTP protection machine learning model 122 may be utilized to generate or update the contact list 198 locally or in conjunction with the server 101. In an embodiment, the computing device 180 may be configured to synchronize the contact list 198 to the server 101 for storage and/or access by computing devices of other users. In implementations, the synchronization may be performed in any suitable manner such as, for example, in a pushing manner initiated by the computing device 180, in a pulling manner initiated by the server 101, or in combination thereof.

While only one server 101, OTP transmitting device 150, network 105, and computing device 180 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For instance, in some embodiments, the feature and functionality of the server 101 may be partially, or fully implemented at the computing device 180.

Figure 2:
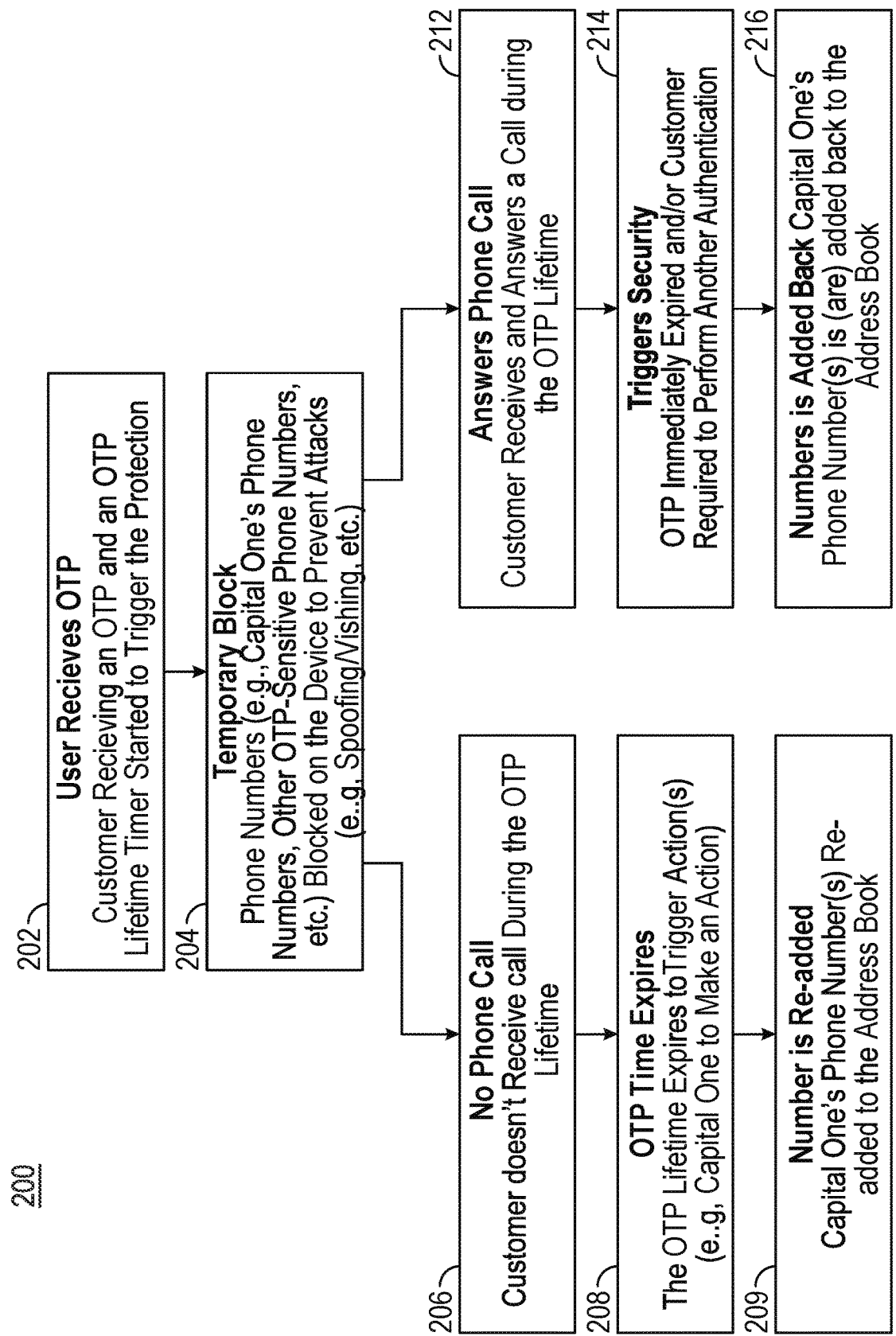
FIG. 2 is a diagram illustrating an exemplary process involving aspects and features associated with OTP protection (e.g., anti-vishing OTP protection), consistent with exemplary aspects of certain embodiments of the present disclosure.

FIG. 2 is a diagram illustrating an exemplary anti-vishing OTP protection using one or more machine learning techniques, consistent with exemplary aspects of certain embodiments of the present disclosure. In this illustrated embodiment, the exemplary anti-vishing OTP protection 200 may provide protection against vishing attacks on valid OTPs received at a device of a customer in two exemplary scenarios. In the first scenario, the customer does not receive any phone call(s) incoming at the device during the lifetime when there is a valid OTP received at the device. In the second scenario, the customer receives and answers a phone call incoming at the device during the lifetime when there is a valid OTP received at the device. Here, the customer may be the user of FIG. 1, and the device may comprise the computing device 180 as illustrated in FIG. 1.

Here, at the beginning of this exemplary protection flow, the customer receives (202) an OTP in, for example, an SMS message at the device (e.g., smartphone). The SMS message may include the information of a lifetime duration of the OTP to indicate how long the OTP is valid. In some embodiments, when the SMS message itself does not include the information indicating the lifetime duration of the OTP embedded therein, various techniques may be applied to obtain such information with regard to when the OTP becomes expired and no longer valid. In one example, an authenticating server (e.g., the server 101 of FIG. 1) and/or an SMS transmitting device (e.g., the OTP transmitting device 150 of FIG. 1) involved in the transmission the SMS message may be queried to obtain the information. In another example, a default duration of time may be assigned as the lifetime duration of the OTP. The default duration of time can be of any suitable length, e.g., 5 minutes, 10 minutes, 15 minutes, and so on. In implementations, the default duration value may be pre-configured by the user at the application 194 of the computing device 180. The information may be specified in the message body along with the OTP or included in the metadata of the SMS message. In either configuration, upon the receipt of the OTP, an OTP lifetime timer may be started on the device of the customer (180) such as to trigger the anti-vishing protection thereon. In this example, the SMS message may be transmitted from a short code, a phone number, or an email address associated with a banking entity such as Capital One.

Next, a temporary block is effectuated (204) at the device for calls incoming from one or more phone numbers determined as presenting a security risk with respect to the OTP. Here, the temporary block may be implemented using a contact list such as an address book (e.g., a collection of the contacts associated with the phone application, etc.) resident on or otherwise available to the device. As shown in FIG. 2, this example protection flow may utilize the address book as a white-listing collection of phone numbers such that phone calls from the numbers on the address book would not be blocked at the device of the customer. As a result, by allowing only the phone numbers enlisted in the address book to come through in a normal manner, the device may be configured to block the phone calls from those numbers not included in the address book. Here, the address book may be updated to remove the phone numbers associated with the one or more phone numbers that are determined, for example, by the OTP protection machine learning model as OTP sensitive (e.g., presenting a security risk to the OTP). In this example, legitimate phone numbers associated with one or more legitimate entities (e.g., OTP issuing entities, entities associated with the OTP issuing entities, other legitimate entities) and other OTP sensitive phone numbers may be removed temporarily from the address book, when the OTP lifetime timer starts. With the phone numbers temporarily absent in the address book, the device may be configured to block any phone calls made from those removed numbers temporarily.

Although not illustrated in this example, it should be noted that the temporary call blocking can be effectuated based on various techniques. As described with more details below with reference to FIG. 4, in some embodiments, instead of using the address book including the user designated or system compiled/processed phone numbers as a white list, the device may be configured to block phone calls based on a black or block list that includes all the phone numbers to be blocked. Such a black or block list may be implemented as a separate contact list utilized by the device in conjunction with the address book such that, for an incoming call to be handled without the OTP protection measure, the call would come from the phone numbers included in the address book and not included in the contact list. In other embodiments, the device may be configured to block calls from the phone numbers on the contact list and allow those from the phone numbers not included in the address book through.

As illustrated herein FIG. 2, in addition to removing one or more legitimate phone numbers associated with one or more legitimate entities from the address book temporarily, phone numbers associated with the identified one or more entities that are fraudsters or potential fraudsters are removed from the address book as well. Thus, the anti-vishing protection provisioned at the device may block calls from three types of entities once the lifetime timer starts and not yet expires. The first type is the authenticating entity that has issued the valid OTP or caused the valid OTP to be issued to the device of the customer. In some embodiments, in addition to the authenticating entity, the anti-vishing protection may further protect the valid OTP from the entity(ies) who spoof(s) the phone numbers associated with the afore-described first type of entities. In this exemplary scenario, calls from the entity(ies) disguised behind the spoofed phone numbers and pretending to be the authenticating entity issuing the valid OTP may be handled with the one or more security measures, described below. The second type is the entities that are known as fraudsters who would have been engaging in various attacks against user's private or sensitive information, such as spoofing attacks, phishing attacks, middleman attacks, vishing attacks, and the like. The third type is the entities that have not been certainly determined as having engaged in any security attacks but are suspicious of being the second type.

In the protection flow along the path 206, during the lifetime of the OTP, the customer does not receive phone call(s) from those above-described three types of entities. This could be that no fraudulent entities have called, or be caused by the call blocking effectuated so that none of the phone calls not enlisted in the address book would be allowed through. In some embodiments and as described with more details with reference to FIGS. 3 and 4, the device may be configured such that the customer would be nevertheless notified of the incoming call along with the various alerts/security measure(s) triggered into action for the call. For example, the call may be blocked to the extent that the customer would not be aware of such an incoming call. In some cases, the user may ignore the incoming call and heeds the alert/security measure(s) in action and would not answer the call.

In path 206, once the lifetime timer would expire, indicating that the OTP would be no longer valid, the device may update locally, and/or notify a server of the entity to update (208) the security measure deployed in response to the then valid OTP. Consequently, the address book on the device may be so updated to add back (209) the previously removed phone numbers of the one or more legitimate entities. In some embodiments not shown here, the address book may be updated such that one or both of the second and third type of phone numbers may be added back as well. This way, more OTP data/user events may be collected or reported from the device, with the user's consent, to provide a server (e.g., the server 101) with more and current data to, for example, train the OTP protection model. In other embodiments, one or both of the second type and third type of phone numbers may remain removed from the address book. In embodiments where the contact list may be used as a black/block list, one or more of these three types of phone numbers may be removed from the black/block list.

On the other hand, since the customer is notified of the incoming call despite the displayed alert and configured security measures, the customer may still answer the call during the lifetime of the valid OTP. In some embodiments, the anti-vishing protection in this scenario is illustrated in path 212. Along this path, various additional security measures may be deployed to provide escalated protection. By way of non-limiting examples, additional security measures (214) may include notifying an authenticating server to invalidate the received OTP immediately, and/or the customer may be required to perform another authentication process. In other embodiments not shown here, with the customer's configured consent, the additional security measures may trigger the monitoring of call(s) the customer answers to further ascertain whether the calling entity is indeed a vishing attacker or not. For instance, the call duration, the content of the conversation of the call, and the like, may be monitored to harvest data for training and re-training the OTP protection model.

When the lifetime timer expires at the end of the path 212, similarly, the phone numbers of the one or more legitimate entities may be added back (216) to the address book. Also, similarly, the phone numbers of the second type and/or third type may be processed similarly to the end of path 206, details are not repeated herein.

Figure 3C:
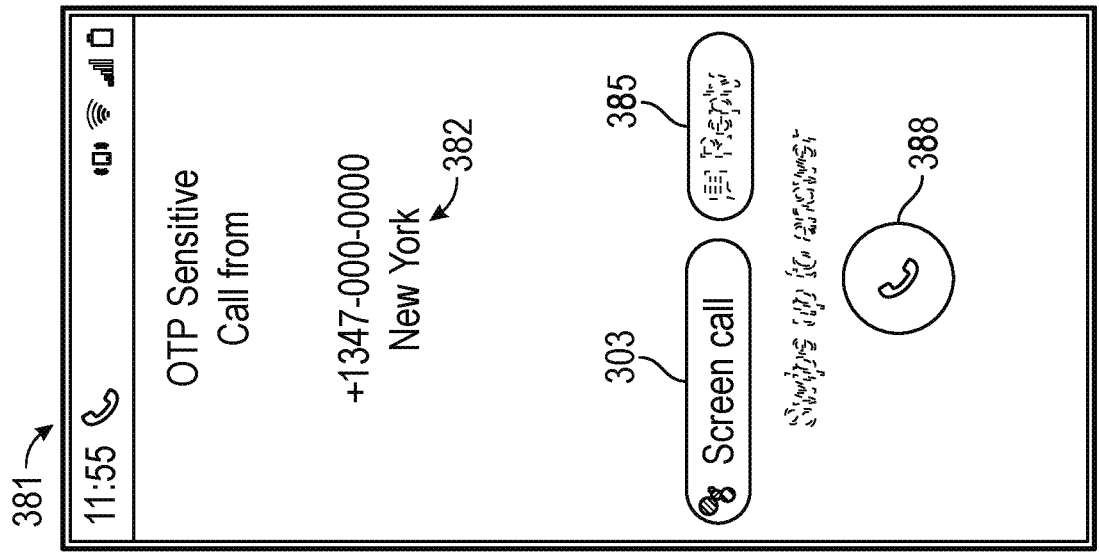
FIGS. 3A-3C are diagrams illustrating exemplary graphical user interfaces (GUIs) involving aspects and features associated with OTP protection (e.g., anti-vishing OTP protection), consistent with exemplary aspects of certain embodiments of the present disclosure.
Figure 3B:
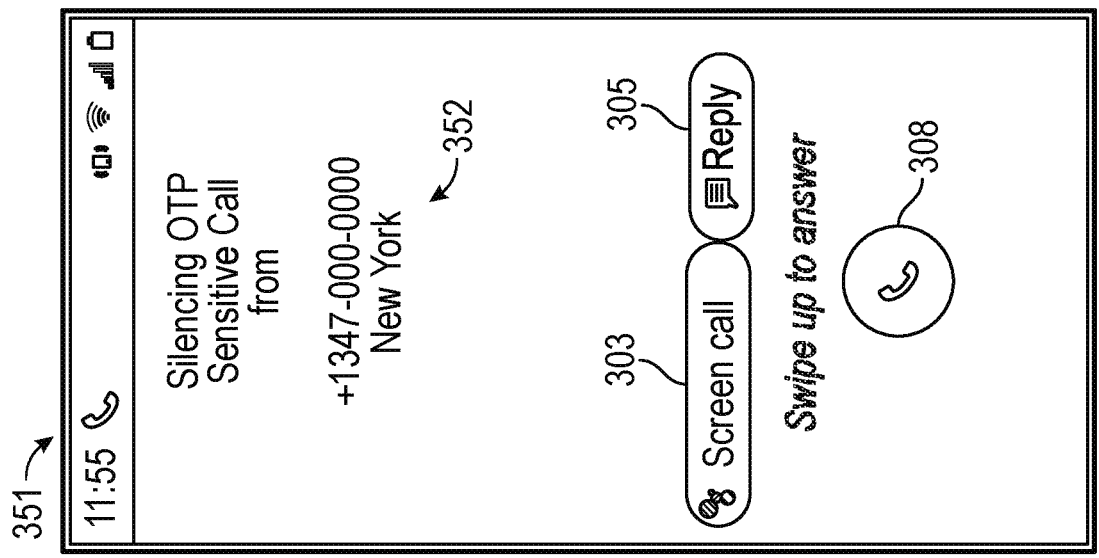
Figure 3A:
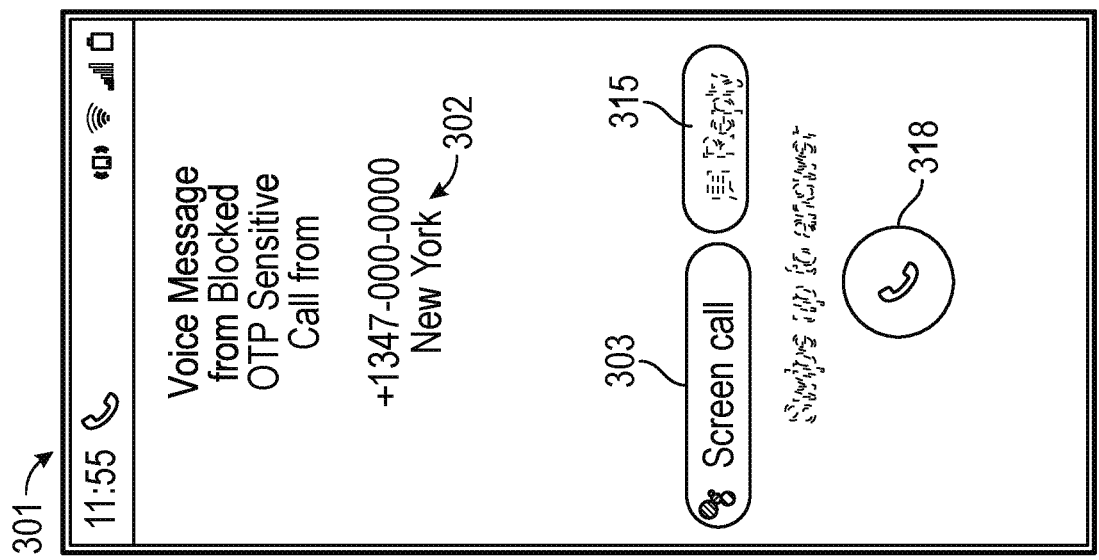

FIGS. 3A-3C are diagrams illustrating exemplary graphical user interfaces (GUIs) involving aspects associated with an exemplary OTP protection (e.g., anti-vishing OTP protection), consistent with exemplary aspects of certain embodiments of the present disclosure. In some embodiments, the GUIs may be provided by an application (e.g., the application 194 executing on the computing device 180 of FIG. 1) and shown on a display of a mobile device (e.g., the computing device 180 of FIG. 1). In some embodiments, prior to the GUIs being displayed in response to an incoming call at the mobile device, an OTP has been received at the mobile device to activate, for example, the application (194) into applying security measures for the incoming call suspicious of being associated with a vishing attack, and the like. In some embodiments, when the OTP becomes invalid after its pre-configured lifetime expires, the application (194) may be deactivated at least to the extent that the triggered security measures would be no longer active due to the fact that there would be no valid OTPs for any fraudulent entities to attack. The embodiment illustrated in FIGS. 3A-3C may correspond to another protection flow path in supplement to those two paths (206 and 212 of FIG. 2) to describe the third scenario, where the user would receive an incoming phone call from one of the phone numbers determined by, for example, the OTP protection machine learning model, as OTP sensitive, and would not have answered it yet.

FIG. 3A illustrates an exemplary GUI 301 of the application (e.g., the application 194) for notifying the user of a voice message from an incoming call that is currently blocked. The GUI 301 may include an alert 302, and a set of buttons 303 for the user to select, as well as options 315, and 318 disabled given that the call is currently being blocked. Here, the alert 302 may notify the user that the voice message has been identified as from an OTP sensitive call (e.g., the call identified as coming from an entity determined as presenting a security risk with regard to the valid OTP received). The alert 302 may include the phone number of the calling entity, i.e., "1-347-000-0000," and "New York" as the area associated with the phone number's area code.

As illustrated at GUI 301, the application (e.g., application 194) would be actively blocking the incoming call in protection against the detected/potential vishing attack against the valid OTP. In some embodiment, the user no longer can interact with the selectable options 315 or 318 to perform certain actions when the blocked call is a pending incoming call. As shown here, the user no longer can select the option 315 to reply with a message, or select the option 318 to swipe up to answer the blocked call. In some embodiments, the user can select the button 303 to screen the blocked call. In some embodiments, the user can select the button 303 to screen the voice message from the blocked call. In other embodiments, the button 303 may be disabled as well so that the user cannot screen the blocked call either. The incoming call can be screened by various techniques to evaluate the characteristics of the calling entity. Exemplary screening techniques may include the user screening a message being recorded on an answering machine or voice mail, the user checking a caller ID display to see who or where the call is from, and the user checking the time or date which a call or message was received. Exemplary screening techniques may also include connecting the calling party to a chatbot service such that the chatbot service may screen the calling party and/or record the conversion. In implementations, screening may be performed by protocols such as Secure Telephony Identity Revisited (STIR), Signature-based Handling of Asserted information using toKENs (SHAKEN) to identify calls associated with spoofed phone numbers, and the like.

Further, the user may perform other actions upon the incoming call in addition to or in place of those illustrated in FIG. 3A. For example, the user can interact with the GUI 301 to decline the incoming call while it is still being blocked, report the phone number included in the alert 302 to a server (e.g., the server 101 of FIG. 1) or log locally as associated with a fraudulent entity without screening the call or after screening the call, report the phone number or log locally as associated with a fraudulent entity after selecting the button 308 to answer the call, report the phone number or log locally as not associated with a fraudulent entity after selecting the button 308 to answer the call, and the like. In one embodiment, the application (e.g., the application 194) that blocks the incoming call during the lifetime of the valid OTP may display no GUI or notification to the user when an incoming call is being blocked from being answered by the user. That is, the application may be configured to block identified incoming calls as a background executing process without a visible GUI. In some embodiments, when the user interacts with the button 308 to answer the incoming call alerted as OTP sensitive, one or more escalated security measures such as those illustrated in FIG. 2 may be activated, the details of which are not repeated here.

FIG. 3B illustrates an exemplary GUI 351 of the application (e.g., the application 194) for notifying the user of an incoming call currently being silenced. The GUI 351 may include an alert 352 and a set of buttons 303, 305, and 308 for the user to select. Here, the alert 352 may be similar to the alert 302 of FIG. 3A, notifying the user that the incoming call has been identified as an OTP sensitive call. The alert 302 may include the phone number of the calling entity, i.e., "1-347-000-0000," and "New York" as the area associated with the phone number's area code. The difference here is that, at GUI 351, instead of blocking, the application is actively silencing the incoming call. In some embodiments, the application may silence the incoming call regardless of the setting already configured with regard to the phone functionality on the device (e.g., the user may not have set the mobile device in silence mode, and the application can overwrite the setting specifically for the identified incoming calls).

Here, at GUI 351, when the application of the application (e.g., the application 194) is actively silencing the incoming call in protection against the detected/potential vishing attack against the valid OTP, the user nevertheless can also interact with the selectable options to perform actions with regard to the pending incoming call. In this example, the user can also select the button 303 to screen the silenced call, select the button 305 to reply with a message, or select the button 308 to swipe up to answer the incoming call. The incoming call can be screened by various techniques to evaluate the characteristics of the calling entity as described above.

Further, the user may also perform other actions upon the incoming call in addition to or in place of those illustrated in FIG. 3B. For example, the user can interact with the GUI 351 to decline the incoming call while it is being silenced, report the phone number included in the alert 352 to the server (e.g., the server 101 of FIG. 1) or log it locally as associated with a fraudulent entity without screening the call or after screening the call, report or log locally the phone number as associated with a fraudulent entity after selecting the button 308 to answer the call, report or log locally the phone number as not associated with a fraudulent entity after selecting the button 308 to answer the call, and the like. In some embodiments, when the user interacts with the button 308 to answer the incoming call alerted as OTP sensitive, one or more escalated security measures such as those illustrated in FIG. 2 may be also activated, the details of which are not repeated here.

FIG. 3C illustrates an exemplary GUI 381 for notifying the user of an incoming call via a negative user interface. The GUI 381 may include an alert 382 and a set of buttons 303, 385, and 388 for the user to select. Here, the alert 382 may be similar to the alert 302 of FIG. 3A and the alert 352 of FIG. 3B, notifying the user that the incoming call has been identified as an OTP sensitive call. The alert 382 may include the phone number of the calling entity, i.e., "1-347-000-0000," and "New York" as the area associated with the phone number's area code. The difference here is that, at GUI 381, instead of blocking or silencing, the application is actively providing negative UIs in association with the incoming call. As illustrated in this embodiment, the button 355 may be rendered as un-selectable, as indicated by the exemplary dashed messaging icon and dashed label "Reply." Similarly, the button 388 may be rendered un-selectable, as indicated by the exemplary dashed label "Swipe Up to Answer."

Here, at GUI 381 of the application (e.g., the application 194), unlike the GUIs 301 and 351, when the application is actively providing the negative UIs for the incoming call in protection against the detected/potential vishing attack against the valid OTP, the user can only interact with the regularly rendered UI elements (e.g., the button 303 is still available for the user to screen the incoming call), but no longer able to select the UI elements rendered negative, e.g., select the button 305 to reply with a message, or select the button 308 to swipe up to answer the incoming call.

Further, the user may also perform other actions upon the incoming call in addition to or in place of those illustrated in FIG. 3C, if the corresponding UI elements are provided at the GUI 381. For example, the user can interact with the GUI 381 to decline the incoming call, report the phone number included in the alert 382 to the server (e.g., the server 101 of FIG. 1) or log locally as associated with a fraudulent entity without screening the call or after screening the call, and the like. In this example, without an operable button 388, the user may be prevented from answering the incoming call as he or she may still be able to at the GUIs 301 or 351.

Figure 4:
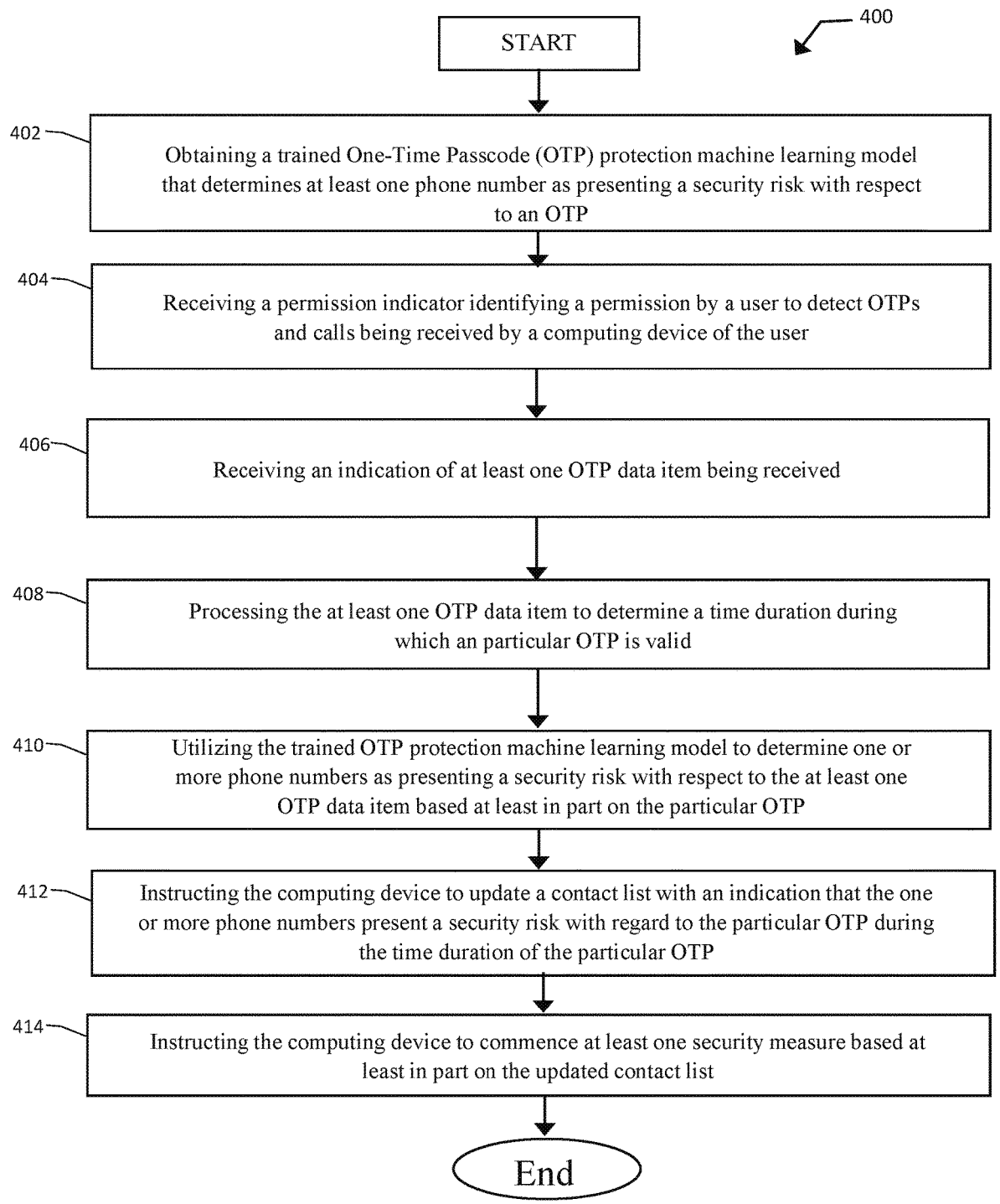
FIG. 4 is a flowchart illustrating an exemplary process related to OTP protection (e.g., anti-vishing OTP protection), consistent with exemplary aspects of certain embodiments of the present disclosure.

FIG. 4 is a flow diagram illustrating an exemplary process 400 related to anti-vishing OTP protection via machine learning techniques, consistent with exemplary aspects of at least some embodiments of the present disclosure. Referring to FIG. 4, the illustrative anti-vishing OTP protection process 400 may comprise: obtaining a trained OTP protection machine learning model that determines at least one phone number as presenting a security risk with respect to an OTP, at 402; receiving a permission indicator identifying a permission by a user to detect OTPs and calls being received by a computing device of the user, at 404; receiving an indication of at least one OTP data item being received, at 406; processing the at least one OTP data item to determine a time duration during which a particular OTP is valid, at 408; utilizing the trained OTP protection machine learning model to determine one or more phone numbers as presenting a security risk with respect to the at least one OTP data item based at least in part on the particular OTP, at 410; instructing the computing device to update a contact list with an indication that the one or more phone numbers present a security risk with regard to the particular OTP during the time duration of the particular OTP, at 412; and instructing the computing device to commence at least one security measure based at least in part on the updated contact list, at 414. In other embodiments, the anti-vishing OTP protection process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the anti-vishing OTP protection process 400 may include, at 402, a step of obtaining a trained OTP protection machine learning model that determines at least one phone number as presenting a security risk with respect to an OTP. With regard to the disclosed innovation, the OTP protection machine learning model may be trained based at least in part on one or more of: (i) a plurality of training OTPs received by a first plurality of users, the plurality of training OTPs associated with a first plurality of issuing entities; (ii) a plurality of training phone numbers determined to be risky with respect to the plurality of OTPs; (iii) one or both of profile information or contextual information of the first plurality of users; and/or (vi) or (iii) one or both of profile information or contextual information of the first plurality of issuing entities.

In some embodiments, the plurality of training OTPs may include various communications including an OTP, portions of an OTP, and/or data that can be utilized to generate, derive, or otherwise access an OTP. By way of non-limiting examples, such communications may be in the forms of an SMS, an MMS, an email, a voice message, a chatting message, a social media message, a push message of an application, and the like. In implementations, the first plurality of issuing entities pertinent to the training OTPs may be determined based on the information associated with the communications. In one example, an issuing entity may identify itself in the message body of a communication. In another example, an issuing entity may be determined by querying a database and/or search engine based on a sender phone number, a short code, an email address, and the like, in the communication.

In some embodiments, the plurality of training OTPs may be generated or otherwise accessed by hardware, firmware, and/or software application programs at computing devices associated with the first plurality of users. In these cases, the issuing entities may be determined differently, for example, based on the entity providing the OTP generating software program, the entity associated with an application or a service to which the first plurality of users have provided the training OTPs, and the like.

In some embodiments, the plurality of training phone numbers determined to be risky with respect to the plurality of OTPs may be obtained or otherwise identified via various resources and/or services. In some examples, the phone numbers associated with vishing calls after the training OTPs may be reported by the first plurality of users, and/or identified by a call and OTP detection application (e.g., the application 194) and reported to a server (e.g., the server 101 of FIG. 1), and/or agencies such as the Federal Trade Commission, Internet Crime Complaint Center, and the like. In both cases, a database recording the phone numbers associated with those vishing calls (attempted or successful) may be accessed to retrieve the training phone numbers in association with the related incidents. In some examples, when a reported and/or identified vishing call is after private or sensitive information other than OTPs (e.g., user's legal name, home address, billing address, credit card numbers, social security numbers, birth date information), the phone numbers associated with those vishing calls may nevertheless be retrieved as the training phone numbers deemed presenting a security risk to OTPs. In various embodiments, the first plurality of users may utilize, for example, the GUI features illustrated with reference to FIGS. 3A-3C to report the phone numbers as from the vishing attackers.

In other embodiments, the plurality of training phone numbers determined to be risky with respect to the plurality of OTPs may include three categories of phone numbers: legitimate phone numbers associated with the first plurality of issuing entities, spoofed phone numbers pretending to be associated with the first plurality of issuing entities, and phone numbers of uncertain and/or unverified association with the first plurality of issuing entities. Legitimate phone numbers associated with the first plurality of issuing entities may be obtained via various sources and/or services, such as, from the profile information of the first plurality of issuing entities, information on the web pages of the first plurality of issuing entities, and/or phone numbers confirmed by various users of an application such as the application 194 of FIG. 1. As to the phone numbers of uncertain and/or unverified association with the first plurality of issuing entities, those phone numbers may have been reported by the users of the application such as the application 194 of FIG. 1, when, for instance, the user does not screen or engage the calling entity and only suspect that the call is from a potentially fraudulent entity given the circumstances.

According to some aspects of the disclosure, equipped with the vast amount of data corresponding to OTP vishing attacks (and/or vishing attacks against other user data/information), the exemplary trained OTP protection machine learning model may classify the first plurality of entities into categories based on a variety of characteristics associated with the authentication processes utilizing the OTPs, user profile information of the first plurality of user, user contextual information of the first plurality of user, and/or entity profile information and/or contextual information of the first plurality of issuing entities, and so on. For example, for an OTP associated with an authentication process related to banking services, the phone numbers deemed as presenting security risks may be provided by the OTP machine learning model as the phone numbers for all the entities that provide banking services. When queried with an entity of a valid OTP that is known to the OTP protection machine learning model, the OTP protection model may output a list of one or more phone numbers crowdsourced, and/or augment the crowdsourced list with one or more phone numbers identified based on above described authentication process, profile, and/or contextual information. For instance, regardless of the category of the known entity associated with the OTP, given the context of a recent or ongoing large scale vishing attacks in the geo-area where the user who received the OTP resides or travels to, the OTP protection model may augment the list with the dynamically identified phone numbers deemed as presenting security risks. On the other hand, for an entity unknown to the OTP protection model, the OTP protection model may output a list using the trained knowledge and intelligence. For example, the OTP protection model may classify the unknown entity into one or more categories and use the category information to retrieve all or portions of the phone numbers deemed as presenting security risks to the one or more categories of entities. Further, the OTP protection model may also process these phone numbers for filtering and/or augmenting based on profile/contextual information, and the like.

According to various aspects of the disclosure, the OTP protection machine learning model may be trained to classify the training data into various types of categories/feature sets based on information such as geographical information, timing information, user browsing history, user transaction history, and so on. This way, when provided with an OTP message associated with an issuing entity, the OTP protection machine learning model may determine one or more phone numbers associated with the entities (or the OTP attacks) within the same geo-area, with a similar timing pattern, a similar browsing history, a similar transaction history, and so on, as the phone numbers determined as presenting a security risk to the OTP. In some embodiments, the OTP protection machine learning model may be trained to provide prediction with regard to the one or more phone numbers deemed as presenting a security risk to the OTP targeting a particular geo-area. In one example, the OTP protection machine learning model may be trained to predict the phone numbers associated with one or more particular area codes corresponding to the geo-area as the one or more phone numbers presenting a security risk based on the contextual information that, for example, an increased number of calls are spoofed to phone numbers of these one or more area codes, and/or such one or area codes are detected as being spoofed at a higher frequency during a time period (e.g., a time period contemporaneous with the lifetime duration of the OTP, a time period falling in a pre-configured window ahead of the lifetime duration of the OTP, and the like).

The user profile information may comprise information relating to one or more of: demographic information, account information, application usage information, any data provided by the user, any data provided on behalf of the user, and the like. The contextual aspect of the user profile information and user contextual information may comprise information relating to one or more of: a timing, a location of the user, an action of a user, calendar information of the user, contact information of the user, habits of the user, preferences of the user, purchase history of the user, browsing history of the user, communication history, travel history, on-line payment service history, profile and/or contextual information of individual(s) and entity(ies) the user is associated with, and the like. In some embodiments, the user profile information and/or user contextual information may be provided by the user, detected by a server (e.g., the server 101 of FIG. 1), and/or a component external thereto, or in a combination thereof.

The entity profile information may comprise information relating to one or more of: type of business, headquarter location, branch location, employee information, management information, revenue information, press release information, product release information, stock information, privacy information, any data provided by the entity, and the like. The contextual information of an entity may comprise information related to one or more of: a timing, an event that triggers the entity into authentication users, communication portals used for authenticating users, incidents reported in association with authenticating users, and the like.

In some embodiments, the OTP protection machine learning model may be trained via a server (e.g., the server 101 of FIG. 1), such as a processor of a computer platform, or an online computer platform. In some embodiments, the processor is associated with an entity that provides a financial service to the user. Here, for example, the at least one computer platform may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training OTPs, the training phone numbers determined as presenting security risks, training user profile/contextual information, training entity profile/contextual information, and/or trained models from a third-party data source, third-party machine learning model generators, and the like.

It should be further understood that, in some embodiments, the OTP protection machine learning model may be trained via a server in conjunction with a computing device of the user. Here, for example, the server may be configured to initially train a baseline OTP protection model based on the above-described training data of the first plurality of users (not including the user) and/or a plurality of such training data from the plurality of third-party data sources. Subsequently, the baseline OTP protection model may be transmitted to the computing device associated with the user to be trained with the particular training data of the user. In other words, an OTP protection model may be trained in various manners and orders as a user-specific model in implementations.

The anti-vishing OTP protection process 400 may include, at 404, a step of receiving a permission indicator identifying a permission by a user to detect OTPs and calls being received by a computing device of the user. In some embodiments, the permission indicator may be received from an application such as the application 194 executing on a computing device of the user. The details are similar to those described with reference to FIG. 1, and not repeated herein. In other embodiments, the permission indicator may be received from an application such as a web page allowing the user to configure his or her settings at a web browser. The user may configure the settings related to OTP, calls, and/or other communication detection capabilities for various computing devices thereof. That is, the permission indicator may be received from an application and/or a computing device other than the application for detecting the OTPs and calls (and other communications), or the computing on which the OTP and call detecting/protection application is executing.

The anti-vishing OTP protection process 400 may include, at 406, a step of receiving an indication of at least one OTP data item being received. In some implementations, the at least one OTP data item may include a particular OTP and associated with an authentication process of a particular issuing entity. The at least one OTP data item may comprise various communication(s) (e.g., an SMS message, an MMS message, an email message, a voice message, a chat message, etc.) that include the particular OTP, portions of a particular OTP, and/or information to generate, derive, or otherwise access a particular OTP. Although embodiments herein are illustrated using authentication process as examples in which OTPs are applied, it should be understood that such anti-attack protection can be applied to other processes, not limited by the embodiments illustrated herein. In other embodiments, data having natures capable of impacting user privacy or computer security, or any data that is to be protected against fraudulent attacks, can be protected as the OTPs described herein, and be provided with the improved anti-vishing protection (and/or improved protection against other forms of attacks).

The anti-vishing OTP protection process 400 may include, at 408, a step of processing the at least one OTP data item to determine a time duration during which the particular OTP is valid. Here, taking an OTP data item as an OTP SMS message for example, the SMS message may include a time duration (e.g., 10 minutes, 15 minutes) during which the OTP associated therewith is valid. Generally, the time duration may start from the point of time when the OTP data item is generated at the issuing entity, transmitted by the issuing entity, or received at the computing device of the user. In some embodiments, and as illustrated with reference to FIG. 2, an OTP lifetime timer may be started at the time the OTP data item is received, and set to expire upon the time duration lapses. In some embodiments, the OTP data item may include the information of a lifetime duration of the OTP to indicate how long the OTP is valid. In some embodiments, when the OTP data item itself does not include the information indicating the lifetime duration of the OTP embedded therein, various techniques may be applied to obtain such information with regard to when the OTP becomes expired and no longer valid. In one example, an authenticating server (e.g., the server 101 of FIG. 1) and/or an SMS transmitting device (e.g., the OTP transmitting device 150 of FIG. 1) involved in the transmission the OTP data item may be queried to obtain the information. In another example, a default duration of time may be assigned as the lifetime duration of the OTP. The default duration of time can be of any suitable length, e.g., 5 minutes, 10 minutes, 15 minutes, and so on. In implementations, the default duration value may be pre-configured by the user at the application 194 (e.g., APP) of the computing device 180.

The anti-vishing OTP protection process 400 may include, at 410, a step of utilizing the trained OTP protection machine learning model to determine one or more phone numbers as presenting a security risk with respect to the at least one OTP data item based at least in part on the particular OTP. Here, the OTP data item may be processed to extract information related to the particular issuing entity, and/or information related to the particular authentication process. In some embodiments, one or more of the particular OTP, the particular issuing entity information, and/or the particular authentication process information may be provided as input to the OTP protection machine learning model, which in turn may determine the one or more phone numbers as presenting a security risk with respect to the at least one OTP data item. In some embodiments, the determined one or more phone numbers may include at least one of: a legitimate phone number associated with the particular issuing entity, a commonly spoofed phone number pretending to be associated with the particular issuing entity, and a phone number of uncertain and/or unverified legitimate association with the particular issuing entity.

The anti-vishing OTP protection process 400 may include, at 412, a step of instructing the computing device to update a contact list with an indication that the one or more phone numbers present a security risk with regard to the particular OTP during the time duration of the particular OTP. In some embodiments, the contact list may be configured as a blocking list such that any incoming call from each of the phone numbers on the contact list is addressed with one or more security measures as described above. As illustrated with reference to FIG. 2, in some embodiments, the legitimate phone numbers associated with the particular issuing entity may also be used to update the contact list to ensure that the anti-vishing protection is enhanced such that even the particular issuing entity is not able to reach the user at the computing device, when its own OTP is alive on the user's computing device. One rationale lies in the fact, as communicated sometimes in the OTP carrying messages themselves, the issuing entity typically has no reasons to follow up with the recently issued and still valid OTP.

The anti-vishing OTP protection process 400 may include, at 414, a step of instructing the computing device to commence at least one security measure based at least in part on the updated contact list. In some embodiments, the contact list may be utilized in conjunction with an address book (e.g., the address book illustrated with reference to FIG. 2). In this case, the address book (white or allow list) is modified such that any phone number entries matching those in the contact list may be removed temporarily (e.g., during the time duration when the OTP is valid) from the address book. Afterwards, any incoming calls at the computing device may be operated according to the address book, for example, only calls associated with the phone numbers on the address book may be allowed through in a normal manner without any mitigating measures such as blocking the call, silencing the call, etc. On the other hand, those calls not associated with any of the phone numbers on the address book may be identified as spam and handled with corresponding mitigating measures such as blocking the call, silencing the call, etc.

In some embodiments, the at least one security measure may include one or more actions to: block an incoming call from the one or more phone numbers received during the time duration, or silence an incoming call from the one or more phone numbers received during the time duration; and/or display a negative user interface (UI) for an incoming call from the one or more phone numbers received during the time duration. The details of those three types of actions are similar to those described with reference to FIGS. 3A-3C, and therefore not repeated herein. Other suitable security measures for handing a call from the one or more phone numbers may be equally applicable here, not limited by the embodiments illustrated.

In some embodiments, the anti-vishing OTP protection process 400 may further include a step of receiving, from the computing device, an indication of an incoming call from the one or more phone numbers received during the time duration being answered by the users; and invalidating the OTP in response to detected a communication with the one or more phone numbers. Here, an application such as the application 194 of FIG. 1 may detect that not only an incoming call from the one or more phone numbers are pending, also the user answers the incoming call despite the security measures triggered into action. For instance, at the GUIs 301 and 351 illustrated with reference to FIGS. 3A-3B, the user can still operate the GUIs to answer an incoming call currently being blocked or silenced. In this case, the anti-vishing OTP protection process 400 may invalidate the OTP immediately, for example, regardless of whether the user ends up sharing the OTP with the calling entity. Any suitable techniques may be applied to invalidate the OTP, for example, by updating the lifetime of the OTP to expire immediately, or otherwise notifying the particular issuing entity to update the OTP as invalid, deleted, not received, and so on. This way, nobody may be able to utilize the OTP in connection with the pending authentication process initiated by the particular issuing entity.

In some embodiments, the anti-vishing OTP protection process 400 may further include a step of instructing the computing device to update the contact list to remove the indication that the one or more phone numbers present a security risk with regard to the particular OTP, after the time duration of the particular OTP expires. In some embodiments, and as illustrated with reference to FIG. 2, when the contact list is updated to remove the one or more phone numbers, upon the sensitive time period during which the OTP is valid expires, the contact list may be updated again to add back the one or more phone numbers. In other embodiments, when a blocking list is used to communicate the one or more phone numbers, the blocking list may be emptied to delete all the phone numbers that are deemed presenting a security risk with regard to the expired OTP. In some embodiments, the blocking list may be updated to indicate that the phone numbers that are deemed presenting a security risk with regard to the expired OTP no longer present a security risk.

Figure 5:
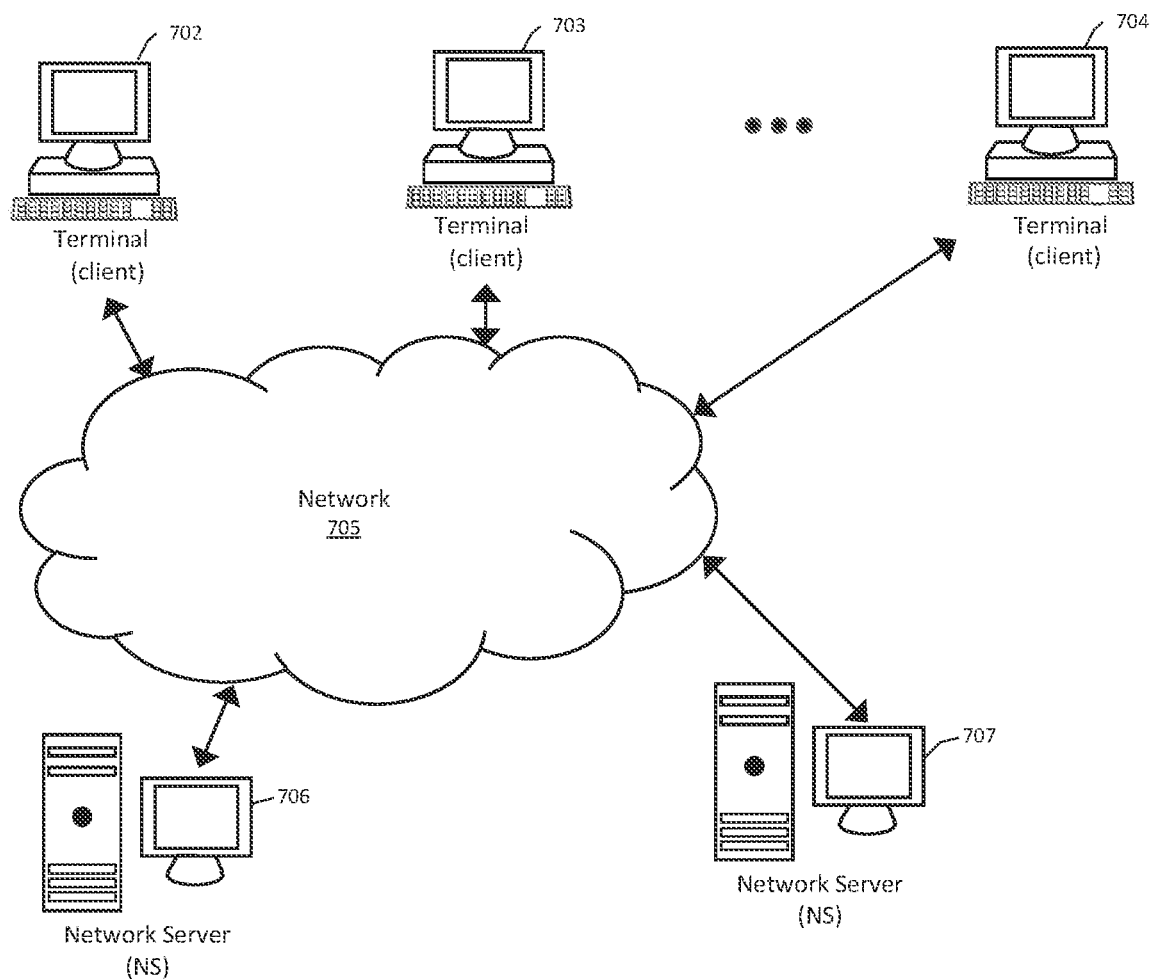
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the computing device 180 of FIG. 1. In some embodiments, the servers 706 and 707 may be configured to implement part of the entirety of the features and functionalities above-described for the server 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may also be implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
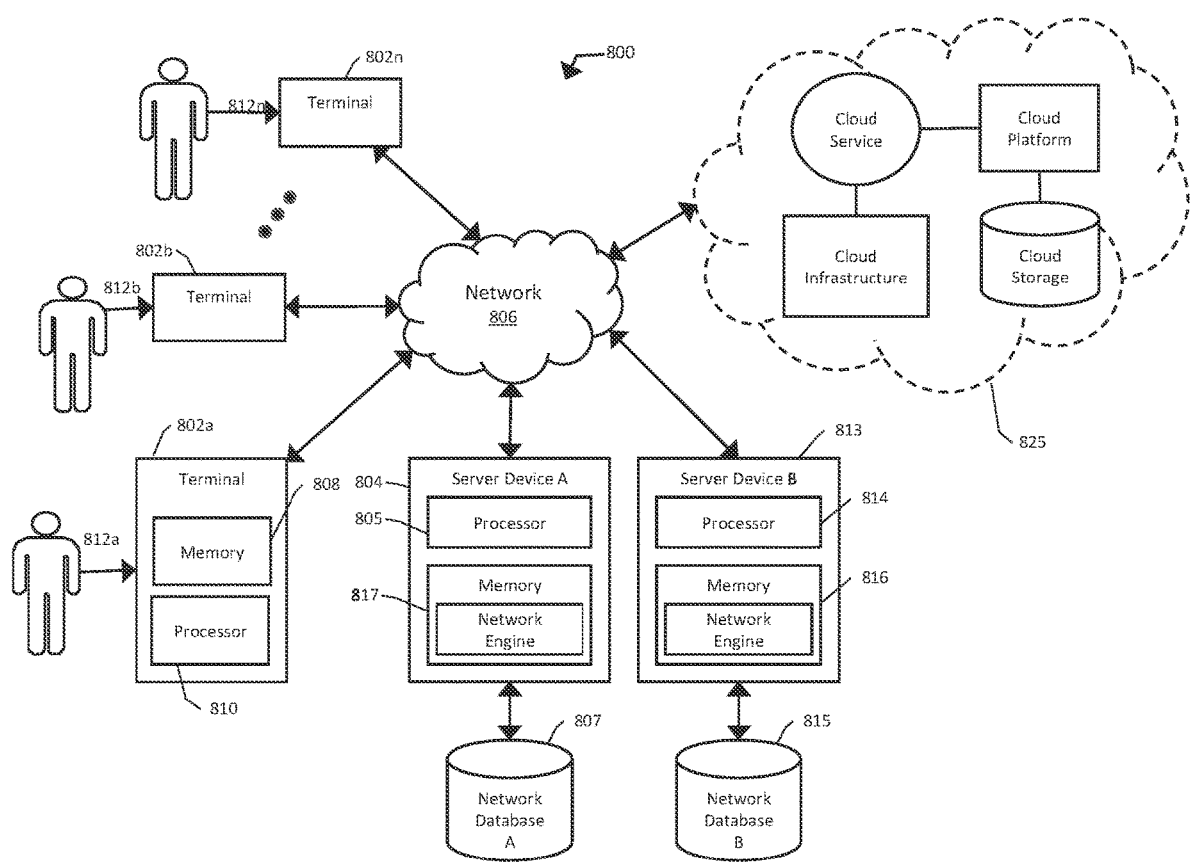
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802a, 802b through 802n shown each at least includes non-transitory computer-readable media, such as a random-access memory (RAM) 808 coupled to a processor 810 and/or memory 808. In some embodiments, the member computing devices 802a, 802b through 802n may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, the server devices 804 and 813 may be configured to implement part of the entirety of the features and functionalities above-described for the server 101 of FIG. 1. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
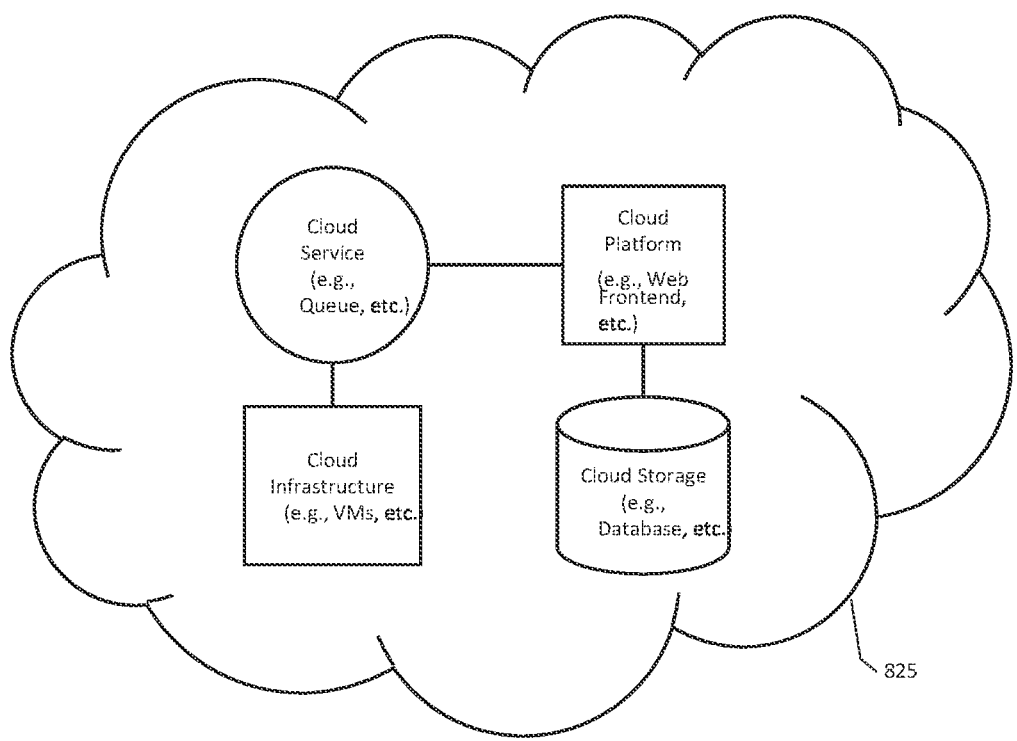
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
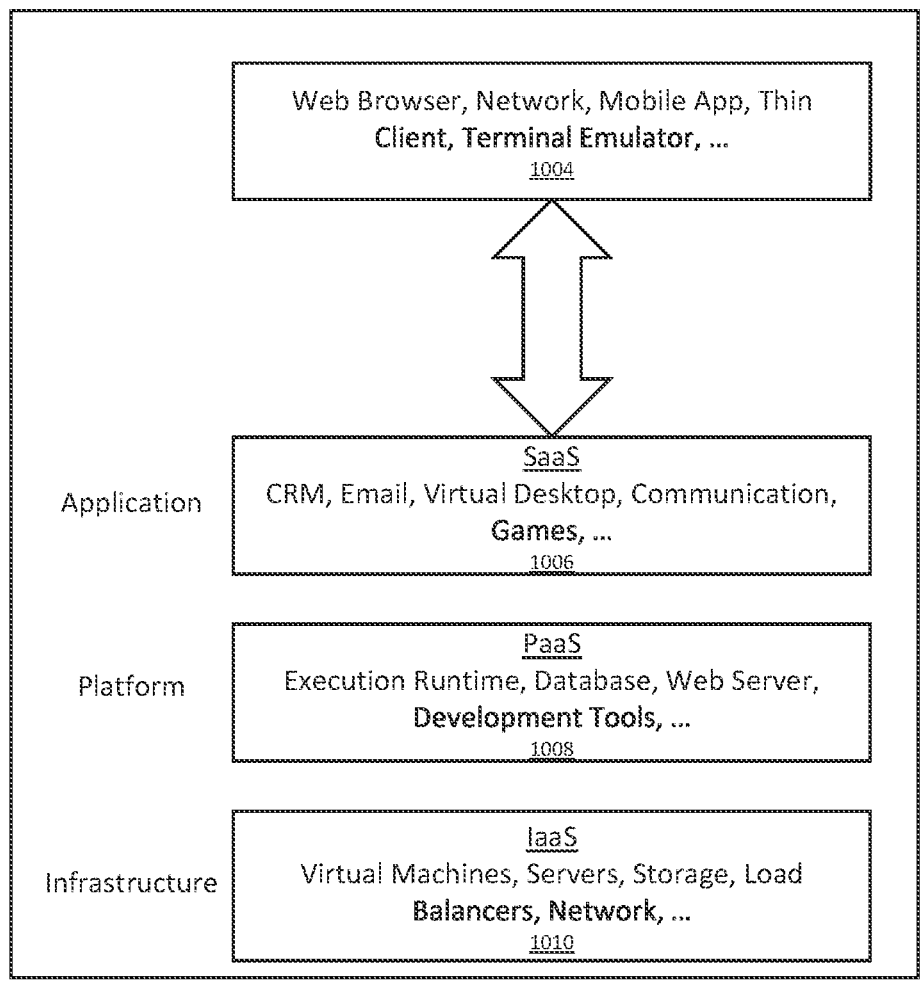

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enabled devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including:
obtaining, by one or more processors, a trained One-Time Passcode (OTP) protection machine learning model that determines at least one phone number as presenting a security risk with respect to an OTP;
receiving, by the one or more processors, from a computing device of a user, a permission indicator identifying a permission by the user to detect OTPs and calls being received by the computing device;
receiving, by the one or more processors, from the computing device, an indication of at least one OTP data item being received, the at least one OTP data item including a particular OTP and associated with an authentication process of a particular issuing entity;
processing, by the one or more processors, the at least one OTP data item to determine a time duration during which the particular OTP is valid;
utilizing, by the one or more processors, the trained OTP protection machine learning model to determine one or more phone numbers as presenting a security risk with respect to the at least one OTP data item based at least in part on the particular OTP;
instructing, by the one or more processors, the computing device to update a contact list with an indication that the one or more phone numbers present a security risk with regard to the particular OTP during the time duration of the particular OTP; and
instructing, by the one or more processors, the computing device to commence at least one security measure based at least in part on the updated contact list.

Clause 2. The method of clause 1 or any clause herein, where the security measure includes at least one of:
block an incoming call from the one or more phone numbers received during the time duration;
instructing, by the one or more processors, the computing device to silence an incoming call from the one or more phone numbers received during the time duration; and
instructing, by the one or more processors, the computing device to display a negative user interface (UI) for an incoming call from the one or more phone numbers received during the time duration.

Clause 3. The method of clause 1 or any clause herein, further including:
receiving, by the one or more processors, from the computing device, an indication of an incoming call from the one or more phone numbers received during the time duration being answered by the user; and
invalidating, by the one or more processors, the OTP in response to detected a communication with the one or more phone numbers.

Clause 4. The method of clause 1 or any clause herein, further including:
instructing, by the one or more processors, the computing device to update the contact list to remove the indication that the one or more phone numbers present a security risk with regard to the particular OTP, after the time duration of the particular OTP expires.

Clause 5. The method of clause 1 or any clause herein, where the one or more phone numbers include at least one of: a legitimate phone number associated with the particular issuing entity, a spoofed phone number pretending to be associated with the particular issuing entity, and a phone number of uncertain and/or unverified legitimate association with the particular issuing entity.

Clause 6. The method of clause 1 or any clause herein, where the OTP protection machine learning model is trained based on:
i) a plurality of training OTPs received by a first plurality of users, the plurality of training OTPs associated with a first plurality of issuing entities;
ii) a plurality of training phone numbers determined to be risky with respect to the plurality of OTPs;
iii) one or both of profile information and contextual information of the first plurality of users or the first plurality of issuing entities, or
iv) one or both of profile information and contextual information of the first plurality of issuing entities.

Clause 7. The method of clause 1 or any clause herein, further including:
receiving, by the one or more processors, from the computing device an indication that a particular phone number presents a security risk to the particular OTP.

Clause 8. The method of clause 1 or any clause herein, where the at least one OTP data item includes one or more of: an email including the particular OTP, an SMS message including the particular OTP, an MMS message including the particular OTP, a voice message including the particular OTP, a chat message including the particular OTP, a social network post including the particular OTP, or an in-app message including the particular OTP.

Clause 9. A system including:
one or more processors; and
a memory in communication with the one or more processors and storing instructions that, when executed by the one or more processors, cause the one or more processors to:
obtain a trained One-Time Passcode (OTP) protection machine learning model that determines at least one phone number as presenting a security risk with respect to an OTP;
receive, from a computing device of a user, a permission indicator identifying a permission by the user to detect OTPs and calls being received by the computing device;
receive, from the computing device, an indication of at least one OTP data item being received, the at least one OTP data item including a particular OTP and associated with an authentication process of a particular issuing entity;
process the at least one OTP data item to determine a time duration during which the particular OTP is valid;
utilize the trained OTP protection machine learning model to determine one or more phone numbers as presenting a security risk with respect to the at least one OTP data item based at least in part on the particular OTP;
instruct the computing device to update a contact list with an indication that the one or more phone numbers present a security risk with regard to the particular OTP during the time duration of the particular OTP; and
instruct the computing device to commence at least one security measure based at least in part on the updated contact list.

Clause 10. The system of clause 9 or any clause herein, where the security measure includes at least one of:
block an incoming call from the one or more phone numbers received during the time duration;
instructing, by the one or more processors, the computing device to silence an incoming call from the one or more phone numbers received during the time duration; and
instructing, by the one or more processors, the computing device to display a negative user interface (UI) for an incoming call from the one or more phone numbers received during the time duration.

Clause 11. The system of clause 9 or any clause herein, where the instructions further cause the one or more processors to:
receive, from the computing device, an indication of an incoming call from the one or more phone numbers received during the time duration being answered by the user; and
invalidate the OTP in response to detected a communication with the one or more phone numbers.

Clause 12. The system of clause 9 or any clause herein, where the instructions further cause the one or more processors to:
instruct the computing device to update the contact list to remove the indication that the one or more phone numbers present a security risk with regard to the particular OTP, after the time duration of the particular OTP expires.

Clause 13. The system of clause 9 or any clause herein, where the one or more phone numbers include at least one of: a legitimate phone number associated with the particular issuing entity, a spoofed phone number pretending to be associated with the particular issuing entity, and a phone number of uncertain and/or unverified legitimate association with the particular issuing entity.

Clause 14. The system of clause 9 or any clause herein, where the OTP protection machine learning model is trained based on:
i) a plurality of training OTPs received by a first plurality of users, the plurality of training OTPs associated with a first plurality of issuing entities;
ii) a plurality of training phone numbers determined to be risky with respect to the plurality of OTPs;
iii) one or both of profile information and contextual information of the first plurality of users or the first plurality of issuing entities, or
iv) one or both of profile information and contextual information of the first plurality of issuing entities.

Clause 15. A non-transitory computer readable storage medium for tangibly storing computer program instructions capable of being executed by a computer processor, the computer program instructions defining the steps of:
obtaining a trained One-Time Passcode (OTP) protection machine learning model that determines at least one phone number as presenting a security risk with respect to an OTP;
receiving from a computing device of a user, a permission indicator identifying a permission by the user to detect OTPs and calls being received by the computing device;
receiving from the computing device, an indication of at least one OTP data item being received, the at least one OTP data item including a particular OTP and associated with an authentication process of a particular issuing entity;
processing the at least one OTP data item to determine a time duration during which the particular OTP is valid;
utilizing the trained OTP protection machine learning model to determine one or more phone numbers as presenting a security risk with respect to the at least one OTP data item based at least in part on the particular OTP;
instructing the computing device to update a contact list with an indication that the one or more phone numbers present a security risk with regard to the particular OTP during the time duration of the particular OTP; and
instructing the computing device to commence at least one security measure based at least in part on the updated contact list.

Clause 16. The computer readable storage medium of clause 15 or any clause herein, where the security measure includes at least one of:
block an incoming call from the one or more phone numbers received during the time duration;
instructing, by the one or more processors, the computing device to silence an incoming call from the one or more phone numbers received during the time duration; and
instructing, by the one or more processors, the computing device to display a negative user interface (UI) for an incoming call from the one or more phone numbers received during the time duration.

Clause 17. The computer readable storage medium of clause 15 or any clause herein, the steps further including:
receiving, from the computing device, an indication of an incoming call from the one or more phone numbers received during the time duration being answered by the user; and
invalidating the OTP in response to detected a communication with the one or more phone numbers.

Clause 18. The computer readable storage medium of clause 15 or any clause herein, the steps further including:
instructing the computing device to update the contact list to remove the indication that the one or more phone numbers present a security risk with regard to the particular OTP, after the time duration of the particular OTP expires.

Clause 19. The computer readable storage medium of clause 15 or any clause herein, where the one or more phone numbers include at least one of: a legitimate phone number associated with the particular issuing entity, a spoofed phone number pretending to be associated with the particular issuing entity, and a phone number of uncertain and/or unverified legitimate association with the particular issuing entity.

Clause 20. The computer readable storage medium of clause 15 or any clause herein, where the OTP protection machine learning model is trained based on:

i) a plurality of training OTPs received by a first plurality of users, the plurality of training OTPs associated with a first plurality of issuing entities;

ii) a plurality of training phone numbers determined to be risky with respect to the plurality of OTPs;

iii) one or both of profile information and contextual information of the first plurality of users or the first plurality of issuing entities, or iv) one or both of profile information and contextual information of the first plurality of issuing entities.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
obtaining, by one or more processors, a trained One-Time Passcode (OTP) protection machine learning model that determines at least one phone number as presenting a security risk with respect to an OTP;
receiving, by the one or more processors, from a computing device of a user, a permission indicator identifying a permission by the user to detect OTPs and calls being received by the computing device;
receiving, by the one or more processors, from the computing device, an indication of at least one OTP data item being received, the at least one OTP data item including a particular OTP and associated with an authentication process of a particular issuing entity;
processing, by the one or more processors, the at least one OTP data item to determine a time duration during which the particular OTP is valid;
utilizing, by the one or more processors, the trained OTP protection machine learning model to determine one or more phone numbers as presenting a security risk with respect to the at least one OTP data item based at least in part on the particular OTP;
instructing, by the one or more processors, the computing device to update a contact list with an indication that the one or more phone numbers present a security risk with regard to the particular OTP during the time duration of the particular OTP; and
instructing, by the one or more processors, the computing device to commence at least one security measure for an incoming call from the one or more phone numbers during the time duration, based at least in part on the updated contact list.

2. The method of claim 1, wherein the security measure comprises at least one of:
blocking an incoming call from the one or more phone numbers received during the time duration;
instructing, by the one or more processors, the computing device to silence an incoming call from the one or more phone numbers received during the time duration; and
instructing, by the one or more processors, the computing device to display a negative user interface (UI) for an incoming call from the one or more phone numbers received during the time duration.

3. The method of claim 1, further comprising:
receiving, by the one or more processors, from the computing device, an indication of an incoming call from the one or more phone numbers received during the time duration being answered by the user; and
invalidating, by the one or more processors, the OTP in response to detecting a communication with the one or more phone numbers.

4. The method of claim 1, further comprising:
instructing, by the one or more processors, the computing device to update the contact list to remove the indication that the one or more phone numbers present a security risk with regard to the particular OTP, after the time duration of the particular OTP expires.

5. The method of claim 1, wherein the one or more phone numbers comprise at least one of: a legitimate phone number associated with the particular issuing entity, a spoofed phone number pretending to be associated with the particular issuing entity, and a phone number of uncertain and/or unverified legitimate association with the particular issuing entity.

6. The method of claim 1, wherein the OTP protection machine learning model is trained based on:
i) a plurality of training OTPs received by a first plurality of users, the plurality of training OTPs associated with a first plurality of issuing entities;
ii) a plurality of training phone numbers determined to be risky with respect to the plurality of OTPs;
iii) one or both of profile information and contextual information of the first plurality of users or the first plurality of issuing entities, or
iv) one or both of profile information and contextual information of the first plurality of issuing entities.

7. The method of claim 1, further comprising:
receiving, by the one or more processors, from the computing device an indication that a particular phone number presents a security risk to the particular OTP.

8. The method of claim 1, wherein the at least one OTP data item comprises one or more of: an email including the particular OTP, an SMS message including the particular OTP, an MMS message including the particular OTP, a voice message including the particular OTP, a chat message including the particular OTP, a social network post including the particular OTP, or an in-app message including the particular OTP.

9. A system comprising:
one or more processors; and
a memory in communication with the one or more processors and storing instructions that, when executed by the one or more processors, cause the one or more processors to:
obtain a trained One-Time Passcode (OTP) protection machine learning model that determines at least one phone number as presenting a security risk with respect to an OTP;
receive, from a computing device of a user, a permission indicator identifying a permission by the user to detect OTPs and calls being received by the computing device;

receive, from the computing device, an indication of at least one OTP data item being received, the at least one OTP data item including a particular OTP and associated with an authentication process of a particular issuing entity;

process the at least one OTP data item to determine a time duration during which the particular OTP is valid;

utilize the trained OTP protection machine learning model to determine one or more phone numbers as presenting a security risk with respect to the at least one OTP data item based at least in part on the particular OTP;

instruct the computing device to update a contact list with an indication that the one or more phone numbers present a security risk with regard to the particular OTP during the time duration of the particular OTP; and instruct the computing device to commence at least one security measure for an incoming call from the one or more phone numbers during the time duration, based at least in part on the updated contact list.

10. The system of claim 9, wherein the security measure comprises at least one of:

blocking an incoming call from the one or more phone numbers received during the time duration;

instructing, by the one or more processors, the computing device to silence an incoming call from the one or more phone numbers received during the time duration; and instructing, by the one or more processors, the computing device to display a negative user interface (UI) for an incoming call from the one or more phone numbers received during the time duration.

11. The system of claim 9, wherein the instructions further cause the one or more processors to:

receive, from the computing device, an indication of an incoming call from the one or more phone numbers received during the time duration being answered by the user; and invalidate the OTP in response to detecting a communication with the one or more phone numbers.

12. The system of claim 9, wherein the instructions further cause the one or more processors to:

instruct the computing device to update the contact list to remove the indication that the one or more phone numbers present a security risk with regard to the particular OTP, after the time duration of the particular OTP expires.

13. The system of claim 9, wherein the one or more phone numbers comprise at least one of: a legitimate phone number associated with the particular issuing entity, a spoofed phone number pretending to be associated with the particular issuing entity, and a phone number of uncertain and/or unverified legitimate association with the particular issuing entity.

14. The system of claim 9, wherein the OTP protection machine learning model is trained based on:

i) a plurality of training OTPs received by a first plurality of users, the plurality of training OTPs associated with a first plurality of issuing entities;

ii) a plurality of training phone numbers determined to be risky with respect to the plurality of OTPs;

iii) one or both of profile information and contextual information of the first plurality of users or the first plurality of issuing entities, or iv) one or both of profile information and contextual information of the first plurality of issuing entities.

15. A non-transitory computer readable storage medium for tangibly storing computer program instructions capable of being executed by a computer processor, the computer program instructions defining the steps of:

obtaining a trained One-Time Passcode (OTP) protection machine learning model that determines at least one phone number as presenting a security risk with respect to an OTP;

receiving from a computing device of a user, a permission indicator identifying a permission by the user to detect OTPs and calls being received by the computing device;

receiving from the computing device, an indication of at least one OTP data item being received, the at least one OTP data item including a particular OTP and associated with an authentication process of a particular issuing entity;

processing the at least one OTP data item to determine a time duration during which the particular OTP is valid;

utilizing the trained OTP protection machine learning model to determine one or more phone numbers as presenting a security risk with respect to the at least one OTP data item based at least in part on the particular OTP;

instructing the computing device to update a contact list with an indication that the one or more phone numbers present a security risk with regard to the particular OTP during the time duration of the particular OTP; and instructing the computing device to commence at least one security measure for an incoming call from the one or more phone numbers during the time duration, based at least in part on the updated contact list.

16. The computer readable storage medium of claim 15, wherein the security measure comprises at least one of:

blocking an incoming call from the one or more phone numbers received during the time duration;

instructing, by the one or more processors, the computing device to silence an incoming call from the one or more phone numbers received during the time duration; and instructing, by the one or more processors, the computing device to display a negative user interface (UI) for an incoming call from the one or more phone numbers received during the time duration.

17. The computer readable storage medium of claim 15, the steps further comprising:

receiving, from the computing device, an indication of an incoming call from the one or more phone numbers received during the time duration being answered by the user; and invalidating the OTP in response to detecting a communication with the one or more phone numbers.

18. The computer readable storage medium of claim 15, the steps further comprising:

instructing the computing device to update the contact list to remove the indication that the one or more phone numbers present a security risk with regard to the particular OTP, after the time duration of the particular OTP expires.

19. The computer readable storage medium of claim 15, wherein the one or more phone numbers comprise at least one of: a legitimate phone number associated with the particular issuing entity, a spoofed phone number pretending to be associated with the particular issuing entity, and a phone number of uncertain and/or unverified legitimate association with the particular issuing entity.

20. The computer readable storage medium of claim 15, wherein the OTP protection machine learning model is trained based on:
  i) a plurality of training OTPs received by a first plurality of users, the plurality of training OTPs associated with a first plurality of issuing entities;
  ii) a plurality of training phone numbers determined to be risky with respect to the plurality of OTPs;
  iii) one or both of profile information and contextual information of the first plurality of users or the first plurality of issuing entities, or
  iv) one or both of profile information and contextual information of the first plurality of issuing entities.

* * * * *